United States Patent [19]
Christensen

[11] Patent Number: 5,393,114
[45] Date of Patent: Feb. 28, 1995

[54] REVERSIBLE UTILITY RAIL AND UTILITY RACK

[76] Inventor: David Christensen, 11 Moores Mills Rd., Pennington, N.J. 08534

[21] Appl. No.: 64,228

[22] Filed: May 7, 1993

Related U.S. Application Data

[63] Continuation-in-part of Ser. No. 908,979, Jul. 6, 1992, Pat. No. 5,238,280, which is a continuation-in-part of Ser. No. 762,575, Sep. 19, 1991, Pat. No. 5,137,320.

[51] Int. Cl.⁶ .................... B26D 27/06; B60P 3/00
[52] U.S. Cl. ......................... 296/36; 296/3; 248/558
[58] Field of Search ............... 296/3, 32, 33, 34, 36, 296/100, 98, 105, 35.3; 248/558, 911, 912; 52/656.2, 656.4, 656.5, 656.6, 656.7; 411/387, 437

[56] References Cited

U.S. PATENT DOCUMENTS

| | | | |
|---|---|---|---|
| 2,134,823 | 11/1938 | Herrman et al. | 248/509 |
| 2,962,133 | 11/1960 | Kivett et al. | 411/437 X |
| 3,099,335 | 7/1963 | Sklar | 411/437 X |
| 3,564,666 | 2/1971 | Dold | 411/437 X |
| 3,877,624 | 4/1975 | Carson | 224/323 |
| 4,390,117 | 6/1983 | Fagan | 224/310 |
| 4,444,427 | 4/1984 | Martin | 296/43 |
| 4,639,033 | 1/1987 | Wheatley et al. | 296/100 |
| 4,708,554 | 11/1987 | Howard | 411/437 X |
| 4,838,602 | 6/1989 | Nett | 296/100 |
| 4,936,724 | 6/1990 | Dutton | 296/100 X |
| 4,984,837 | 1/1991 | Dise | 296/3 |
| 5,002,324 | 3/1991 | Griffin | 296/3 |
| 5,052,739 | 10/1991 | Irwin | 296/100 X |
| 5,143,415 | 9/1992 | Boudah | 296/3 |
| 5,165,750 | 11/1992 | Pirhonen | 296/100 |

*Primary Examiner*—David M. Mitchell
*Assistant Examiner*—Andrew C. Pike
*Attorney, Agent, or Firm*—Kenneth P. Glynn; Diane L. Ferrone

[57] ABSTRACT

The present invention is a reversible utility or mounting rail for pickup truck cargo beds. The rail is an elongated member having a generally L-shaped cross section with two legs 90 degrees opposed which are of equal or unequal length, each rail having an inside and an outside wall; at least one elongated holding slot running along at least a portion of the outside first wall; provision located on the outside first wall for mounting the elongated member to a structure with a plurality of attachment devices; at least one elongated holding slot running along at least a portion of the outside second wall; and provision on the outside second wall for mounting said elongated member to a structure with a plurality of attachment devices; thereby creating attaching capability for the rail by attachment through its first or its second walls or both and thereby creating a rail which may be mounted on a structure with either of its walls in the horizontal position.

11 Claims, 5 Drawing Sheets

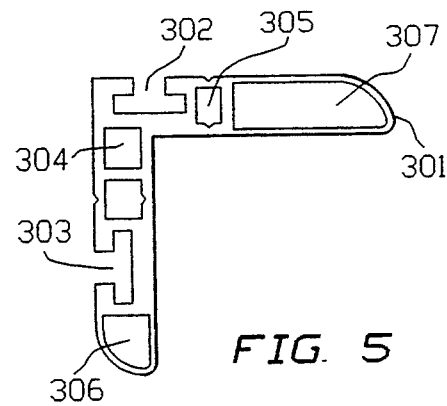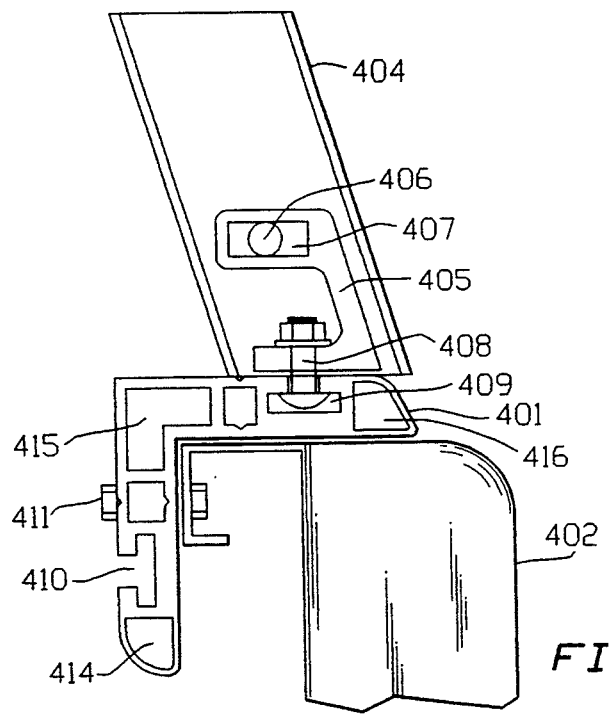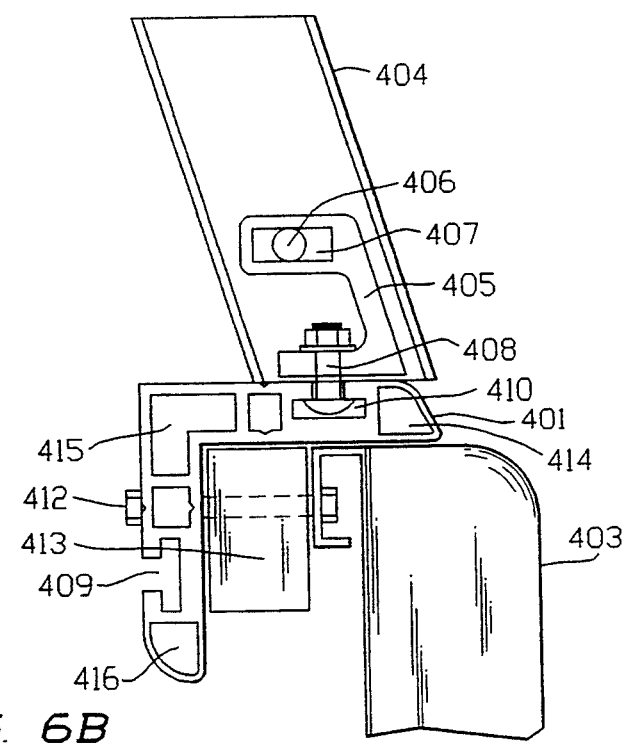

REVERSIBLE UTILITY RAIL AND UTILITY RACK

REFERENCE TO RELATED CASE

This application is a continuation-in-part of U.S. patent application Ser. No. 07/908,979, filed on Jul. 6, 1992, and entitled "Utility Rack With Enhanced Rails," by the same inventor herein, now U.S. Pat. No. 5,238,280, which itself is a continuation-in-part of U.S. patent application Ser. No. 07/762,575, filed on Sep. 19, 1991, entitled "Ladder Utility Rack and Mounting Rail" by the same inventor herein, now U.S. Pat. No. 5,137,320.

BACKGROUND OF THE INVENTION

1. Field of the Invention

This invention relates to utility rails for pickup truck cargo beds and the like, and particularly such utility rails which support tool boxes, racks for carrying ladders and other items of substantial length, and other attachable items which exceed the length of a cargo bed. The invention also relates to such utility rails as they include enhanced utility racks.

2. Information Disclosure Statement

With the development of cargo bed trucks came racks to support items for transport—frames for carrying lumber, glass, ladders, etc. They were initially made of wood and took on a box-like open frame configuration. Subsequently, metal racks were developed to increase both strength and longevity. While the development of ladder utility racks and other racks did not stand still, most improvements pertained to "enhancing" the basic open box-like framing by adding to it rather than changing the framing configuration itself. With the development of enhanced utility racks came the need to use creative mounting techniques, and novel mounting rails evolved in the present invention. Related prior art is as follows:

U.S. Pat. No. 2,134,823 describes a 1938 ladder rack which is side mounted and includes a complex clamping lever. U.S. Pat. No. 3,877,624 describes a ladder rack involving a plurality of bows which traverse the top of a closed truck, wherein one of the bows has clamps to clamp ladders. The bows are independently attached to the vehicle and are not connected in any fashion. Further, they appear not to be adaptable to cargo beds for carrying items having lengths greater than the cargo bed. U.S. Pat. No. 4,390,117 describes a ladder rack for vehicles involving parallel side members and transverse cross members. It is adapted for mounting on the roof of a vehicle and, again, would not be effective for a pickup bed. Also, complex rack attachment and ladder attachment mechanisms are included.

U.S. Pat. No. 4,444,427 teaches an auxiliary structured element for pickup cargo beds which includes a four sided frame and subsequent cross members for mounting a deck, e.g., a top with an access door.

U.S. Pat. No. 4,984,837 is directed to a load support assembly for pickup trucks. This device has vertical mounting supports and a tiltable load support cross member. It is used for transporting items in the cargo bed tilted upwardly and forwardly; it is cab mounted and cannot carry lengthy items in a horizontal position.

Most recently issued U.S. Pat. No. 5,002,324 describes a utility rack for pickup cargo beds. The rack has two inverted "U"-type stanchions attached to a continuous rail that encompasses both sidewalls and the forward wall of the cargo bed, itself forming a "U"-type configuration in the horizontal plane. The rear stanchion is movable and removable. This is different from the present invention in the shortcoming of not teaching the present invention reversible utility rail and also differs in the extra weight and material required for the forward wall section of the continuous rail, whereas the present invention relies upon parallel rails not connected directly to one another. It is also more difficult to install since this prior art device has exact fixed width of separation of the rail due to the direct connection. It is also subject to loosening and wearing of the rear stanchion mounting parts and even subject to the possibility of accidental disassemblage of the rear stanchion. Infinite positioning of a stanchion or more than two stanchions are not provided for. Finally, because of the need for close tolerances of the rear stanchion and its mounts, the precise separation of the rail at its rear portion is essential to enable a user to subsequently mount the rear stanchion. None of those shortcomings exist with the present invention device.

SUMMARY OF THE INVENTION

The present invention is a reversible utility or mounting rail, as well as a ladder utility rack for pickup cargo beds with the reversible rail. The rack is mounted with two present invention rails to cargo bed walls. Each rail is an elongated member having a generally L-shaped cross section comprised of two legs 90 degrees opposed, having inside walls and outside walls; at least one elongated holding slot running along at least a portion of the outside first wall; provision located on the first leg for mounting said elongated member to a structure with a plurality of attachment devices, at least one elongated holding slot running at least a portion of the outside second wall; and provision located on the second leg for mounting said elongated member to a structure with a plurality of attachment devices; thereby creating attaching capability for said rail by creating a rail which may be mounted on a structure with either leg in the horizontal position. These rails are mounted to a cargo bed and are not connected to one another. The utility rack has stanchion units which have vertical legs running from each of the rails upwardly and inwardly and terminate at a commonly connected horizontal cross member. A preferred embodiment includes a rack with stanchions and stanchion mounting blocks having T-bolts or carriage bolts on the bottoms for insertion and tightening within T-slots on the reversible rails.

BRIEF DESCRIPTION OF THE DRAWINGS

The present invention should be more fully understood when the specification herein is taken in conjunction with the drawings appended hereto, wherein:

FIG. 5 shows a present invention utility rail having equal leg lengths and differing T-slot locations within each leg, and;

FIGS. 6A and 6B show a present invention utility rail having equal leg lengths and identical T-slot location within each leg, mounted to wide and narrow cargo bed walls, achieving similar stanchion mounting block locations with the use of a spacer.

DETAILED DESCRIPTION OF THE INVENTION

The reversible rail of the present invention has as one of its objectives the critical feature of reversibility. The rail is elongated and has two legs in L-shaped relationship which may be of equal or unequal length. Either leg is adapted to be mounted on a cargo bed side wall or other base and either the first or second leg may be the resting or horizontal surface.

It is another objective to provide a holding slot on the first leg which has a specific location relative to the inside wall of the second leg. A second holding slot is provided on the second leg at a different location relative to the inside wall of the first leg. The reversibility of the rails allows the horizontal holding slot of one rail to be maintained in closer proximity to the horizontal holding slot of the opposite rail by installing rails in one of two possible positions. This variability along with an adjustment provided for in the stanchion mounting block allows the mounting of one fixed size stanchion unit on a number of various width cargo beds.

It is another objective to provide a utility rail with T-slots located in the same positions relative to the inside walls of their opposite legs and accommodation of varying width cargo bed wall to wall distances would be provided for in the form of shims or spacers behind the inside vertical wall of a leg or legs.

It is a further objective to provide one or more holding slots in both legs so that the rail can be used as a multipurpose utility rail, e.g., with rack stanchions and/or tool boxes mounted on horizontal surfaces and clamps, tie downs, supports, etc., mounted on vertical surfaces.

It is another objective to provide the present invention rail with holding slots of substantial length, e.g., the entire rail length, to afford the user an infinite number of locations of mounted devices or items along the holding slot length.

The utility rack of the present invention has as another of its objectives to provide a rack which is durable, versatile, and yet less complex than conventional racks. It is also an objective to provide a utility rack which has an inwardly biased horizontal cross section for receiving ladders and the like away from the outer periphery of the vehicle. It is also an objective to provide an easily installable rack which may be adapted for acting as a platform for mounting other items for transport, such as tools, tool boxes, storage bins, generators, pumps, gas motors, etc.

Figure 1:
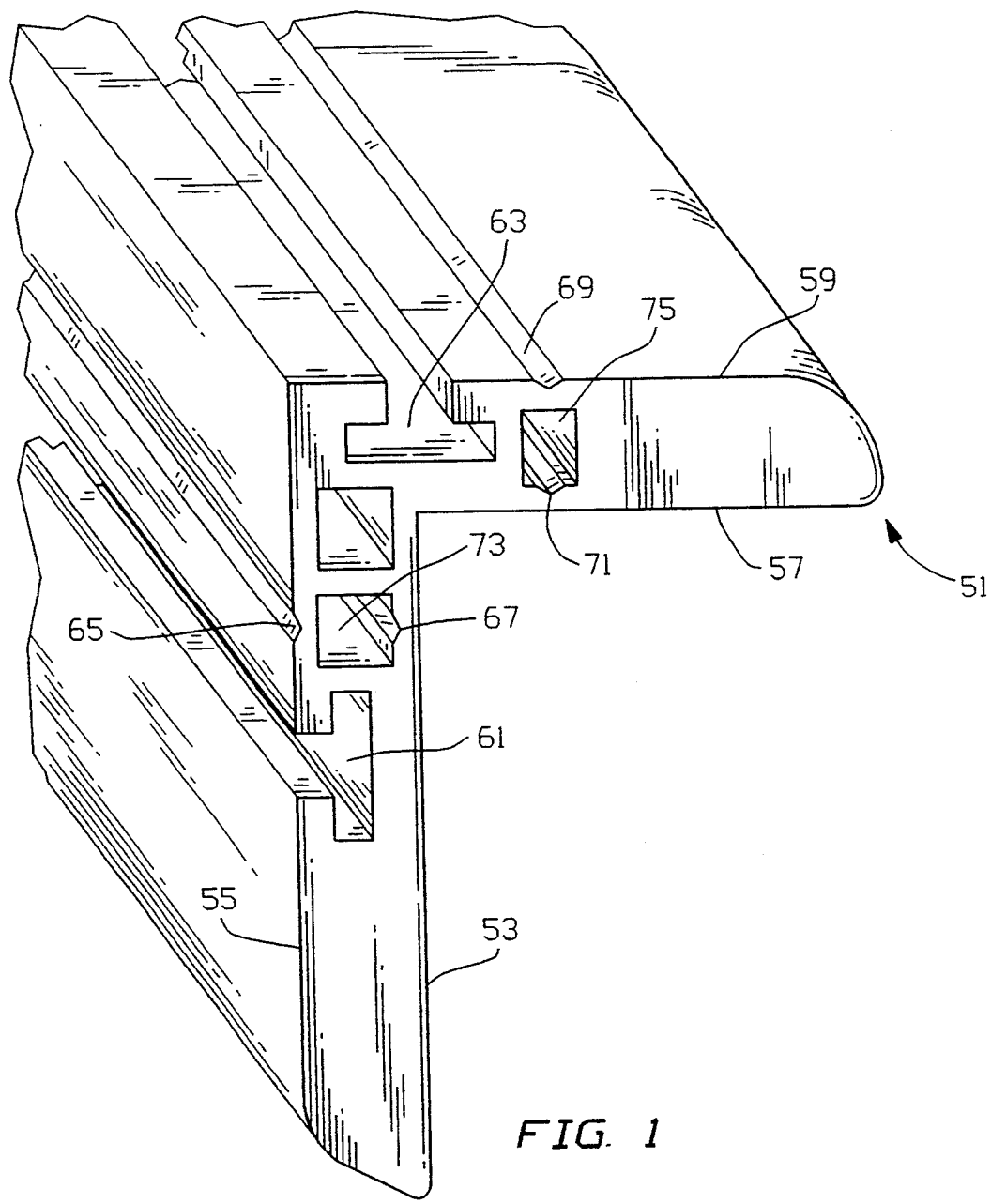
FIG. 1 shows a front perspective view of a reversible utility rail of the present invention.

Referring to FIG. 1, there is shown a present invention reversible utility rail comprising elongated member 51 with a first inside wall 53 and a first outside wall 55 and a second inside wall 57 and a second outside wall 59 which converge with walls 53 and 55, respectively, to form an L-shaped elongated member 51. A first holding slot 61 is shown which is cut into longer outside wall 55. This first holding slot 61 is in the form of a T-slot but could be a dovetail slot, an oval slot with a square top, or any other cutout which would be narrower or constricted toward the outside wall 55 so that some male fastener counterpart could be slid along the holding slot so as to secure another member to the reversible utility rail of FIG. 1. Holding slot 63 in wall 59 would have the same function as holding slot 61 in wall 55.

Within the structure of the first leg comprised of the structure between first inside wall 53 and first outside wall 55 is a first hollow area 73. This has a first penetration means 65 located above it cut into the surface of first outside wall 55 and also has a second penetration means 67 formed at its inner base. These first penetration means 65 and second penetration means 67 enable a user to more easily locate and drill to secure a bolt through elongated member 51 for attachment thereof to the wall of a cargo bed of a pickup truck or other structure.

A second hollow area 75 includes above it a third penetration means 69 which is a continuous groove and a fourth penetration means 71 located within the second hollow area 75, which is also a continuous groove. This enables a user to predrill and more readily screw a fastener through elongated member 51 along penetration means 69.

Note that the L-shaped configuration of elongated member 51 is such that the first inside wall 53 and the second inside wall 57 are interchangeable in the sense that either wall could be used as a horizontal wall or as a vertical wall for mounting, depending on the distance required to maintain slots within a range which would be within a stanchion unit's adjustability, hence the critical reversibility feature of the present invention. The use of such reversible utility rails as is shown in FIG. 1 is shown generally in FIG. 2 in conjunction with a utility rack of the present invention and a particular type of fastening means is shown more specifically in FIG. 3, below.

Figure 2:
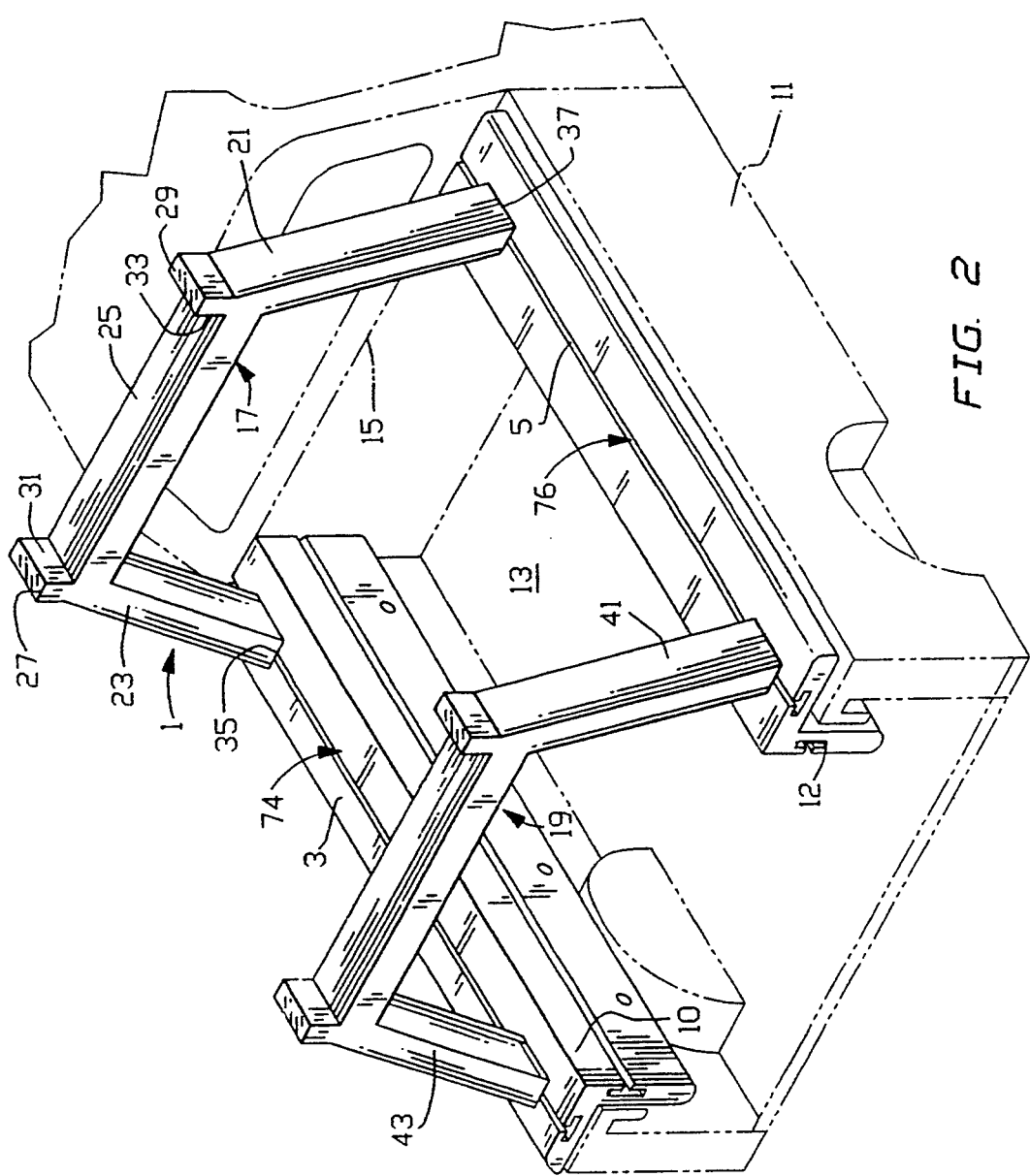
FIG. 2 shows a top perspective view of the present invention utility rails with an enhanced utility rack.

Referring now to FIG. 2, there is shown a top perspective view of a utility rack 1 attached to reversible rails 74 and 76. The reversible rails 74 and 76 are similar to the rail 51 of FIG. 1 and are bolted at the vertical walls 10 and 12 to the top of cargo bed 13 of pickup truck 11. The pair of reversible rails 74 and 76 (left and right, looking at the rear end of truck 11) are each unistructurally formed, e.g., by extrusion. The horizontal walls 3 and 5 of left rail 74 and right rail 76 extend to rest atop the sidewalls of cargo bed 13 and the vertical walls 10 and 12 seat against and are bolted to the sidewalls, as shown. These may be bolted down, clamped, or affixed by any known means.

Utility rack 1 includes stanchion units 17 and 19. Front stanchion unit 17 is attached to horizontal rail walls 3 and 5 at the lower portions 35 and 37 of vertical legs 23 and 21, e.g., by bolting, or other known means of attachment, e.g., such as is described in conjunction with FIG. 3 below. The vertical legs 21 and 23 extend upwardly and inwardly and are mounted forwardly, as shown, and are connected by horizontal cross member 25. Lateral support blocks 27 and 29 are atop cross member 25 and, although optional, are preferred. These keep ladders, lumber, pipes, etc., from sliding or rolling off laterally at their inside surfaces 31 and 33. Also, due to the inward configuration of the vertical legs (e.g., 21 and 23), such items as ladders are transported away from the outer periphery of the pickup truck. This becomes important when the truck is in motion and turning. The center of gravity is better maintained and there may be less tipping. This is safer and will cause less wear of shocks and springs. Also, note that the stanchions are not connected directly to one another but are connected by horizontal cross members, as shown.

Rear stanchion unit 19 has vertical legs 41 and 43 and these are similarly attached to the rails 74 and 76 as are legs 21 and 23. Also, they generally have the same cross sections, angles, sizes, etc., as the forward stanchion unit, and although an exact replication is not critical, it is preferred.

Figure 3:
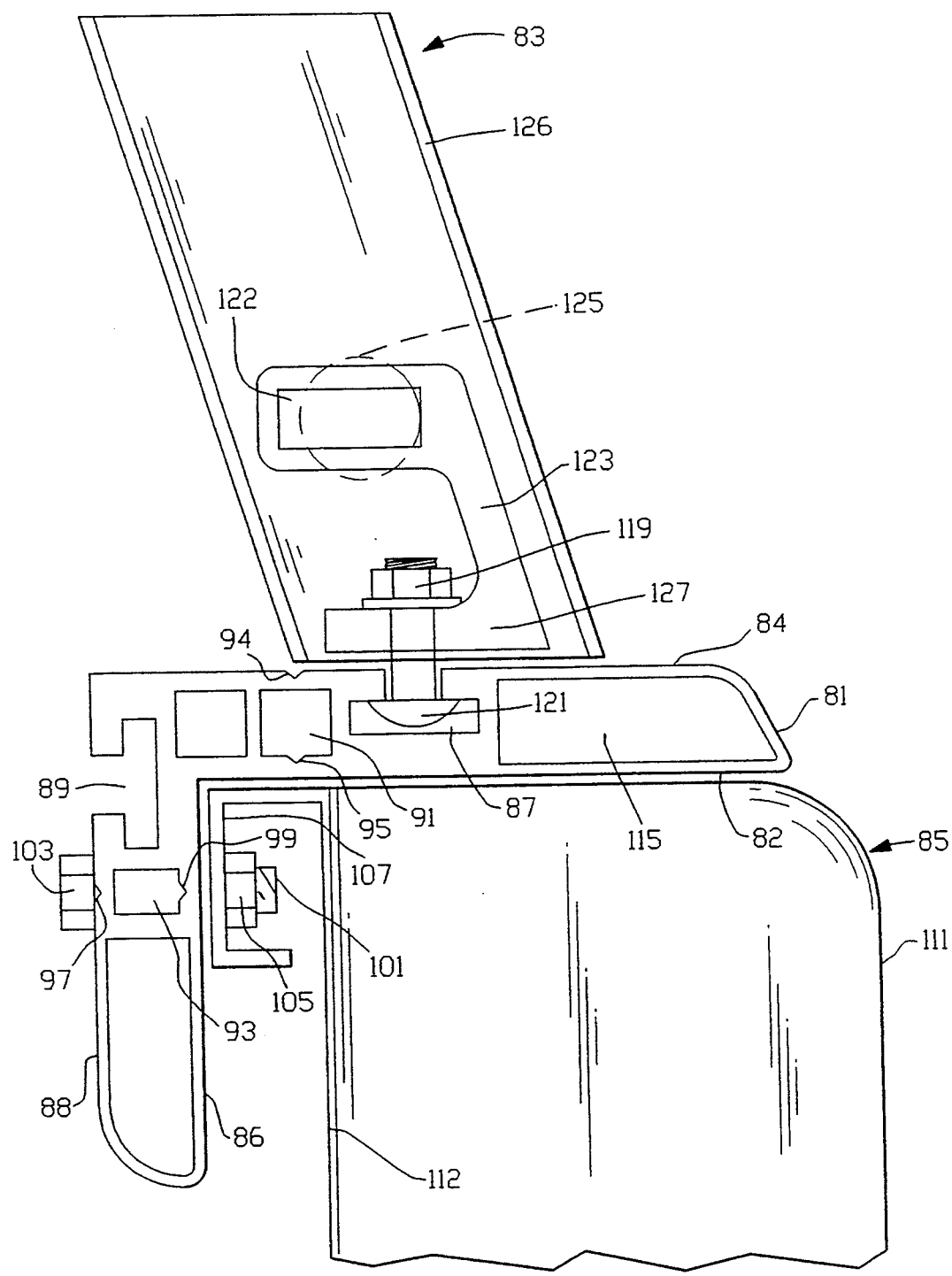
FIG. 3 illustrates a partial end cut view of one side of a cargo bed with yet another alternative present invention utility rail, utility rack, and stanchion mounting block.

FIG. 3 shows an end view of a present invention reversible utility rail 81, a present invention utility rack 83, stanchion portion 83, a stanchion mounting block 127, and a pickup truck cargo bed wall portion 85.

Reversible utility rail 81 is formed of an L-shaped elongated member with a first inside wall 82 and a first outside wall 84, as well as a second inside wall 86 and a second outside wall 88. Within the first wall is hollow area 115 as well as hollow area 91 with grooves forming location guides 94 and 95. The second walls include a hollow area 93 with grooves 97 and 99 for penetration means and these are used to guide drills for a fixation of reversible utility rail 81. In this case, cargo bed wall 85 includes outer wall 111 and inner wall 112 with overhang 107, such as might be found in a 1985 Ford. With such an arrangement, if utility rails with unequal legs are used, the longer legs would be used for the horizontal portions of the reversible utility rail and the shorter legs for the vertical portion, as shown. Likewise, the penetration means 97 and 99 are penetrated, e.g., by drilling, and bolt 101 with head 103 and nut 105 is typical of a series of bolts running down the length of the cargo bed wall overhang 107 for attachment of the reversible utility rail 81 to the cargo bed, as shown. Further, it is noted that the hollow area 91 is not used for fastening but, perhaps could be, or, would be if the reversible utility rail 81 were, in fact, reversed. Also, note that T-slot 89 is not used but T-slot 87 is used to secure a stanchion mounting block 127 via T-bolt or carriage bolt head 121 and nut 119. Fastening member 127 has an upright portion 123 and an orifice 122 through which bolt 125 passes for fixing the fastening member 127 to the upright base portion of stanchion 126 of utility rack 83. Note that orifice 122 is elongated to allow for some adjustability with respect to the stanchion as to its movement relative to reversible utility rail 81.

The elongated hole 122 in stanchion mounting block 127, when considered with two possible T-slot locations provided for by reversing rail 81, allows mounting of a stanchion unit with a fixed distance between its vertical legs on trucks with different inside wall to wall dimensions.

If a cargo bed such as would be found on a 1988 Dodge pickup were to be used, the utility rail would be reversed, and the shorter leg would be used in the horizontal position. The relative change in T-slot location from the previous Ford position would compensate for the inside cargo bed wall-to-wall distance of the Dodge being slightly wider than in the Ford (or Chevrolet) position.

As an alternative to using fastening member 127, there could be flanges or base plate located directly on bottom of stanchion 126 with its own T-bolt or other fastening mechanism. Likewise, fastening member 127 type fasteners could be secured on the inside or the outside of the stanchion members, depending upon particular design, size, whether or not the base of the stanchion would be hollow, etc., without exceeding the scope of the present invention.

Figure 4A:
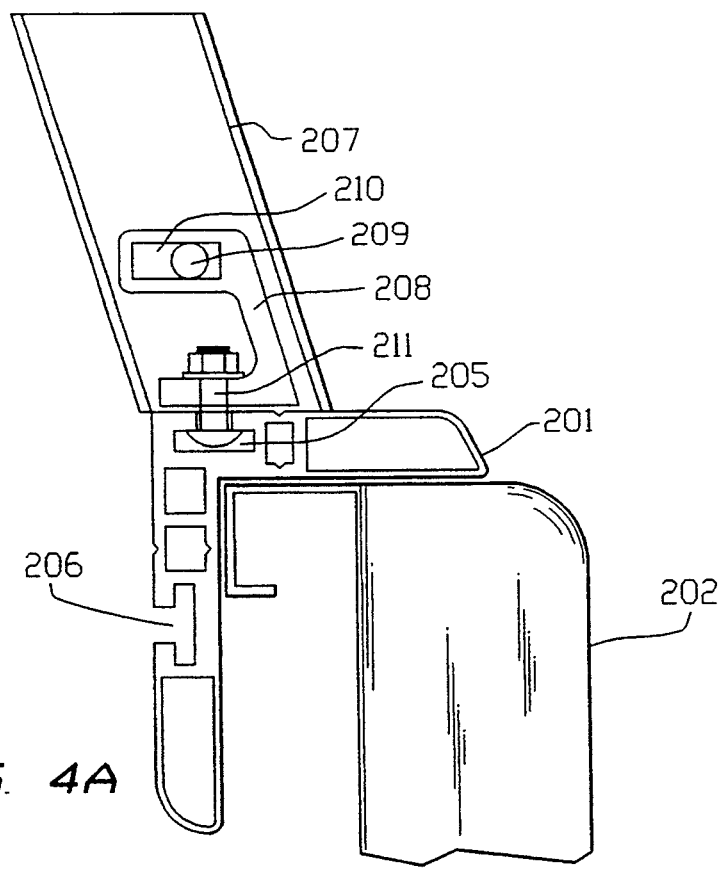
FIGS. 4A and 4B show a present invention utility rail having unequal leg lengths and differing T-slot locations within each leg, mounted to wide and narrow cargo bed walls, achieving similar stanchion mounting block locations.
Figure 4B:
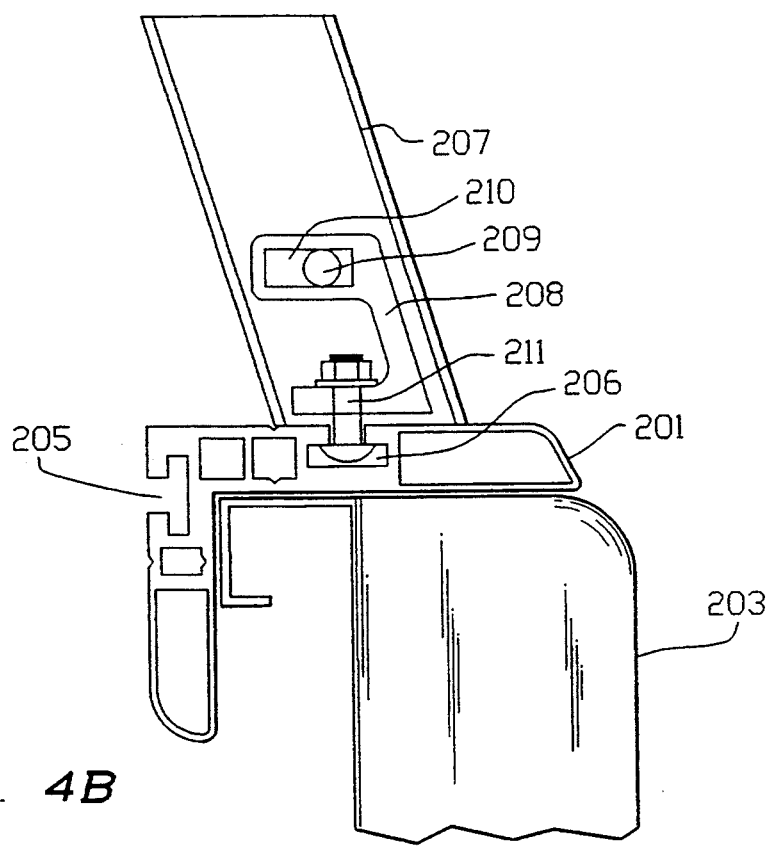

FIGS. 4A and 4B show two possible installation positions of a present invention utility rail having unequal leg lengths and different T-slot locations within each leg. T-bolts or carriage bolts 211 mount stanchion mounting block 208 to utility rail 201 via T-slots 205 and 206. FIG. 4A shows utility rail 201 installed to accommodate a narrow cargo bed wall 202, such as would be found on a 1988 Dodge full size pickup truck. FIG. 4B shows utility rail 201 installed to accommodate a wide cargo bed wall 203, such as would be found on a 1985 Ford full size pickup truck or might be found on any full size Ford or Chevrolet pickup truck. The difference in location of T-slot 205 compared to that of T-slot 206, in relationship to their corresponding legs, allows their final installed positions on narrow and wide cargo bed walls to be in approximately the same position relative to the outside of truck bodies 202 and 203 and relative to the stanchion unit 207. Adjustment to accommodate minor differences in cargo bed wall-to-wall distances are provided for by allowing lateral movement between stanchion unit 207 and stanchion mounting block 208 with mounting through bolt 209 sliding laterally within elongated hole 210.

FIG. 5 shows a present invention utility rail having equal leg lengths and different T-slot locations within each leg. When utility rial 301 is mounted on a narrow width cargo bed wall, T-slot 302 would be in the horizontal position and utility rail 301 would be anchored to cargo wall with fasteners through hollow area 304. When utility rail 301 is mounted on a wide width cargo bed wall, T-slot 303 would be in the horizontal position and utility rail 301 would be anchored to cargo bed wall with fasteners through hollow area 305. Remaining hollow areas 306 and 307 are not mechanically functional but serve to aid economy in extrusion.

FIGS. 6A and 6B show a present invention utility rail having equal leg lengths and identical locations of T-slots within each leg. In FIG. 6A utility rail 401 is mounted to a wide width cargo bed wall 402 via fasteners 411. Stanchion unit 404 is mounted by through bolt 406 in any one of a number of positions laterally adjustable within elongated hole 407 to stanchion mounting block 405. Stanchion mounting block 405 is mounted with T-bolt or carriage bolt 408 which is anchored in T-slot 409 to utility rail 401. FIG. 6B shows the same utility rail 401, mounted in the same or reversed position, to a narrow width cargo bed wall 403 via fasteners 412. In this case to accommodate the narrower width of cargo bed wall 403, a spacer 413 is added to shift T-slot 410 to a position which will allow the installation of the same width stanchion unit 404 as used on example in FIG. 6A above. The stanchion unit 404 and utility rail 401, being in close enough relationship with each other to allow through bolt 406 to be inserted through elongated hole 407, would then be fastened together by bolting as in description of FIG. 6B above. T-slots 410 in FIG. 6A and 409 in FIG. 6B are maintained free of mounting fasteners and may be used for adjustable position cargo anchors and the like. Hollow areas 414, 415, and 416 are not mechanically functional but serve to aid economy in extrusion.

Obviously, numerous modifications and variations of the present invention are possible in light of the above teachings. It is therefore understood that within the scope of the appended claims, the invention may be practiced otherwise than as specifically described herein.

What is claimed is:

1. A reversible mounting rail, for attachment to pickup truck cargo bed structures, which comprises:
    an elongated member with an elongated length having a generally L-shaped cross section comprised of two legs, one being a first leg and the other being a second leg, said two legs being 90 degrees opposed, each of said two legs having an inside wall and an outside wall, said two legs each having predetermined widths wherein said first leg is wider than said second leg and wherein said inside wall of said second leg has a predetermined width adapted to fit atop a first width cargo bed wall and said inside wall of said first leg has a predetermined width adapted to fit atop a second width cargo bed wall, wherein said second width cargo bed wall is wider than said first width cargo bed wall;
    at least one elongated holding slot running along the outside wall of the first leg and at least one elongated holding slot running along the outside wall of the second leg; first penetration location means located on the outside wall of said first leg for locating areas where said elongated member may be penetrated with a plurality of attachment devices for attaching said rail to a structure, said first penetration location means being a groove running along at least a portion of said elongated length of said elongated member; and,
    second penetration location means located on the outside wall of said second leg for locating areas where said elongated member may be penetrated with a plurality of attachment devices for attaching said rail to a structure, said second penetration location means being a groove running along at least a portion of said elongated length of said elongated member;
    thereby creating attaching capability for said rail by attachment through said first leg or said second leg or both and thereby creating a rail which may be mounted on a structure with either said first leg or said second leg in the horizontal position.

2. The rail of claim 1 wherein said elongated member is an extruded unistructurally formed elongated member.

3. The rail of claim 1 wherein said elongated member has at least one hollow formation running the entire length of said elongated member.

4. The rail of claim 3 wherein said inside walls meet each other with predetermined thicknesses between the outside walls and the corresponding inside walls, and those thicknesses decrease along lines away from where said inside walls meet one another.

5. The rail of claim 1 wherein said holding slots are inverted T-shaped holding slots.

6. The rail of claim 1 wherein said holding slot in the first leg is in a specific position relative to the inside wall of the second leg and said holding slot in the second leg is in a different position relative to the inside wall of the first leg.

7. A reversible mounting rail, for attachment to pickup truck cargo bed structures, which comprises:
    an elongated member with an elongated length having a generally L-shaped cross section comprised of two legs, one being a first leg and the other being a second leg, said two legs being 90 degrees opposed, each of said two legs having an inside wall and an outside wall, said two legs each having predetermined widths wherein said first leg is wider than said second leg;
    at least one elongated holding slot running along the outside wall of the first leg and at least one elongated holding slot running along the outside wall of the second leg wherein said holding slot in the first leg is in a specific position relative to the inside wall of the second leg and said holding slot in the second leg is in a different position relative to the inside wall of the first leg;
    first penetration location means located on the outside wall of said first leg for locating areas where said elongated member may be penetrated with a plurality of attachment devices for attaching said rail to a structure, said first penetration location means being a groove running along at least a portion of said elongated length of said elongated member; and,
    second penetration location means located on the outside wall of said second leg for locating areas where said elongated member may be penetrated with a plurality of attachment devices for attaching said rail to a structure, said second penetration location means being a groove running along at least a portion of said elongated length of said elongated member;
    thereby creating attaching capability for said rail by attachment through said first leg or said second leg or both and thereby creating a rail which may be mounted on a structure with either said inside wall of said first leg or said inside wall of said second leg in the horizontal position.

8. The rail of claim 7 wherein said elongated member is an extruded unistructurally formed elongated member.

9. The rail of claim 7 wherein said elongated member has at least one hollow formation running the entire length of said member.

10. The rail of claim 9 wherein said inside walls meet each other with predetermined thicknesses between the outside walls and the corresponding inside walls, and those thicknesses decrease along lines away from where said inside walls meet one another.

11. The rail of claim 7 wherein said holding slots are inverted T-shaped holding slots.

* * * * *